United States Patent
Lv et al.

(10) Patent No.: US 9,665,392 B2
(45) Date of Patent: May 30, 2017

(54) SYSTEM AND METHOD FOR SUPPORTING INTRA-NODE COMMUNICATION BASED ON A SHARED MEMORY QUEUE

(71) Applicant: Oracle International Corporation, Redwood Shores, CA (US)

(72) Inventors: Xianzheng Lv, Beijing (CN); Yongshun Jin, Beijing (CN); Xugang Shen, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 94 days.

(21) Appl. No.: 13/804,687

(22) Filed: Mar. 14, 2013

(65) Prior Publication Data

US 2013/0246556 A1   Sep. 19, 2013

Related U.S. Application Data (60) Provisional application No. 61/612,144, filed on Mar. 16, 2012.

(51) Int. Cl.
*G06F 15/167* (2006.01)
*G06F 9/46* (2006.01)
(Continued)

(52) U.S. Cl.
CPC ............ *G06F 9/466* (2013.01); *G06F 3/0659* (2013.01); *G06F 9/544* (2013.01); *G06F 9/546* (2013.01);
(Continued)

(58) Field of Classification Search
CPC .......... G06F 9/466; G06F 9/546; G06F 9/544; G06F 15/167; G06F 3/0659; G06F 17/30289; H04L 67/10; H04L 67/02
See application file for complete search history.

(56) References Cited

U.S. PATENT DOCUMENTS 5,261,089 A   11/1993   Coleman
5,452,445 A   9/1995   Hallmark
(Continued)

FOREIGN PATENT DOCUMENTS

| CN | 101438248 A | 5/2009 |
|---|---|---|
| CN | 102203779 A | 9/2011 |
| CN | 102317913 A | 1/2012 |

OTHER PUBLICATIONS

United States Patent and Trademark Office, Office Action Dated Jan. 15, 2016 for U.S. Appl. No. 13/804,414, 25 Pages.
(Continued)

*Primary Examiner* — Chris Parry
*Assistant Examiner* — Soe M Hlaing
(74) *Attorney, Agent, or Firm* — Tucker Ellis LLP (57) ABSTRACT

A system and method can support intra-node communication based on a shared memory queue. The shared memory queue can be associated with a shared memory, to which one or more communication peers are attached. The shared memory queue operates to allocate one or more message buffers in the shared memory that contains a first message from a sender to a receiver, and can send the first message to the receiver by linking the one or more message buffers with another message queue. Optionally, a second message buffer may be created, and the message can be sent to the receiver by copying the message to the second message buffer and linking it with another message queue. Additionally, the shared memory queue operates to receive a second message from another sender by delinking one or more message buffers associated with said second message.

20 Claims, 7 Drawing Sheets

(51) Int. Cl.
*G06F 17/30* (2006.01)
*G06F 9/54* (2006.01)
*H04L 29/08* (2006.01)
*G06F 3/06* (2006.01)

(52) U.S. Cl.
CPC ...... *G06F 15/167* (2013.01); *G06F 17/30289* (2013.01); *H04L 67/02* (2013.01); *H04L 67/10* (2013.01)

(56) References Cited

U.S. PATENT DOCUMENTS

| | | | |
|---|---|---|---|
| 5,555,396 A * | 9/1996 | Alferness et al. | G06F 9/546 |
| 5,617,537 A * | 4/1997 | Yamada et al. | G06F 15/17 |
| 5,652,885 A | 7/1997 | Reed | |
| 5,680,610 A | 10/1997 | Smith | |
| 6,070,202 A * | 5/2000 | Minkoff et al. | G06F 9/5016 |
| 6,154,847 A | 11/2000 | Schofield | |
| 6,247,023 B1 | 6/2001 | Hsiao | |
| 6,374,243 B1 | 4/2002 | Kobayashi | |
| 6,470,342 B1 | 10/2002 | Gondi | |
| 6,629,153 B1 | 9/2003 | Gupta | |
| 6,754,842 B2 | 6/2004 | Kettley | |
| 7,103,597 B2 | 9/2006 | McGoveran | |
| 7,284,018 B1 | 10/2007 | Waldorf | |
| 7,380,155 B2 | 5/2008 | Fung | |
| 7,430,740 B1 | 9/2008 | Molloy | |
| 7,694,178 B2 | 4/2010 | Hobson | |
| 7,725,446 B2 | 5/2010 | Huras | |
| 7,743,036 B2 | 6/2010 | Cotner | |
| 7,822,727 B1 | 10/2010 | Shaughnessy | |
| 7,913,261 B2 | 3/2011 | Mitchell et al. | |
| 7,970,737 B2 | 6/2011 | Parkinson | |
| 8,868,506 B1 | 10/2014 | Bhargava | |
| 9,146,944 B2 | 9/2015 | Parkinson | |
| 2001/0047436 A1* | 11/2001 | Sexton et al. | G06F 9/4428 |
| 2002/0023129 A1 | 2/2002 | Hsiao | |
| 2002/0116568 A1 | 8/2002 | Oksanen | |
| 2002/0144006 A1* | 10/2002 | Cranston | G06F 9/544 719/312 |
| 2003/0005172 A1 | 1/2003 | Chessell | |
| 2003/0035372 A1 | 2/2003 | Schaub | |
| 2003/0154423 A1 | 8/2003 | Egolf et al. | |
| 2004/0015079 A1 | 1/2004 | Berger et al. | |
| 2004/0123293 A1 | 6/2004 | Johnson | |
| 2004/0153349 A1 | 8/2004 | K. | |
| 2004/0153450 A1 | 8/2004 | K | |
| 2004/0158549 A1 | 8/2004 | Matena | |
| 2005/0044551 A1 | 2/2005 | Sodhi | |
| 2005/0144171 A1 | 6/2005 | Robinson | |
| 2005/0144299 A1 | 6/2005 | Blevins et al. | |
| 2005/0182795 A1 | 8/2005 | Murthy | |
| 2005/0262055 A1 | 11/2005 | Newport | |
| 2005/0262077 A1 | 11/2005 | Barnes | |
| 2006/0010026 A1 | 1/2006 | Nenov | |
| 2006/0075277 A1 | 4/2006 | Johnson | |
| 2006/0080668 A1* | 4/2006 | Blackmore et al. | G06F 13/00 |
| 2006/0136887 A1 | 6/2006 | Kaczynski | |
| 2006/0149791 A1 | 7/2006 | Sinha | |
| 2006/0179125 A1 | 8/2006 | Pavlik | |
| 2006/0235853 A1 | 10/2006 | Luo | |
| 2007/0041392 A1 | 2/2007 | Kunze | |
| 2007/0079077 A1* | 4/2007 | Baines et al. | G06F 5/12 |
| 2007/0156729 A1* | 7/2007 | Shaylor | G06F 5/065 |
| 2007/0165625 A1 | 7/2007 | Eisner | |
| 2008/0127219 A1 | 5/2008 | Lacombe | |
| 2008/0147945 A1 | 6/2008 | Zimmer | |
| 2008/0177955 A1 | 7/2008 | Su | |
| 2008/0243865 A1 | 10/2008 | Hu | |
| 2008/0250074 A1 | 10/2008 | Parkinson | |
| 2009/0070330 A1 | 3/2009 | Hwang | |
| 2009/0158397 A1 | 6/2009 | Herzog | |
| 2009/0172153 A1 | 7/2009 | Cohen | |
| 2009/0248765 A1 | 10/2009 | Akidau | |
| 2009/0292744 A1 | 11/2009 | Matsumura | |
| 2010/0042999 A1 | 2/2010 | Dorai | |
| 2010/0169284 A1 | 7/2010 | Walter | |
| 2010/0198920 A1 | 8/2010 | Wong | |
| 2011/0055313 A1 | 3/2011 | Little | |
| 2011/0087633 A1 | 4/2011 | Kreuder | |
| 2011/0145204 A1 | 6/2011 | Maple | |
| 2012/0084274 A1 | 4/2012 | Renkes | |
| 2012/0131285 A1* | 5/2012 | Leshchiner | G06F 9/544 711/147 |
| 2012/0166889 A1 | 6/2012 | El-Kersh | |
| 2012/0210094 A1 | 8/2012 | Blocksome | |
| 2013/0066949 A1 | 3/2013 | Colrain | |

OTHER PUBLICATIONS

United States Patent and Trademark Office, Notice of Allowance and Fee(s) Due Dated Mar. 9, 2016 for U.S. Appl. No. 13/828,906, 6 Pages.

State Intellectual Property Office of the People's Republic of China, Office Action Dated Dec. 23, 2016 for Chinese Patent Application No. 201380008047.6, 10 Pages.

State Intellectual Property Office of the People's Republic of China, Office Action Dated Dec. 26, 2016 for Chinese Patent Application No. 201380008052.7, 12 Pages.

IBM, IBM® DB2 Universal Database™ Administration Guide: Performance Version 8, © Copyright International Business Machines Corporation 1993-2002, Entire Book. download on Jan. 20, 2017 from: <ftp://ftp.software.ibm.com/ps/products/db2/info/vr8/pdf/letter/db2d3e80.pdf>.

-Hirotaka Taruzawa, Takakiyo Tanaka, Aim! J2EE Architect Mission Critical Systems Development Course, Monthly Java World, Japan, Tokyo: IDG Japan, April 1, 2005, vol. 9 No. 4 (Serial No. 95), pp. 130-141.

Yoshihiro Iwamiya, Shigeru Urushibara, 3. Art to Support Distributed Transaction Processing, Basic Knowledge 4 for SE, Distributed-Transaction Processing 1st Edition, Tokyo : Co. Ltd. RIC Telecom, April 20, 1994, 1st Edition, pp. 84-91, 228, 262-263, ISBN4-89797-056-3.

* cited by examiner

SYSTEM AND METHOD FOR SUPPORTING INTRA-NODE COMMUNICATION BASED ON A SHARED MEMORY QUEUE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Xianzheng Right Lv, Yongshun Jim Jin and Xugang Shen, filed Mar. 16, 2012, which application is herein incorporated by reference.

CROSS REFERENCE TO RELATED APPLICATIONS

This application is related to the following patent applications, each of which is hereby incorporated by reference in its entirety:

U.S. Patent Application titled "SYSTEM AND METHOD FOR SUPPORTING BUFFER ALLOCATION IN A SHARED MEMORY QUEUE", application Ser. No. 13/804,414, filed Mar. 14, 2013; and U.S. Patent Application titled "SYSTEM AND METHOD FOR TRANSMITTING COMPLEX STRUCTURES BASED ON A SHARED MEMORY QUEUE", application Ser. No. 13/804,608, filed Mar. 14, 2013.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting buffer allocation in a shared memory queue. The shared memory queue can be associated with a shared memory, to which one or more communication peers are attached. The shared memory queue operates to allocate one or more message buffers in the shared memory that contains a first message from a sender to a receiver, and can send the first message to the receiver by linking the one or more message buffers with another message queue. Additionally, the shared memory queue operates to receive a second message from another sender by delinking one or more message buffers associated with said second message.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for a transactional middleware machine environment. It will be apparent to those skilled in the art that other types of transactional middleware machine environments can be used without limitation.

Described herein are systems and methods that can support intra-node communication based on a shared memory.

Inter-Process Communication Message Queue (IPCQ)

Figure 1:
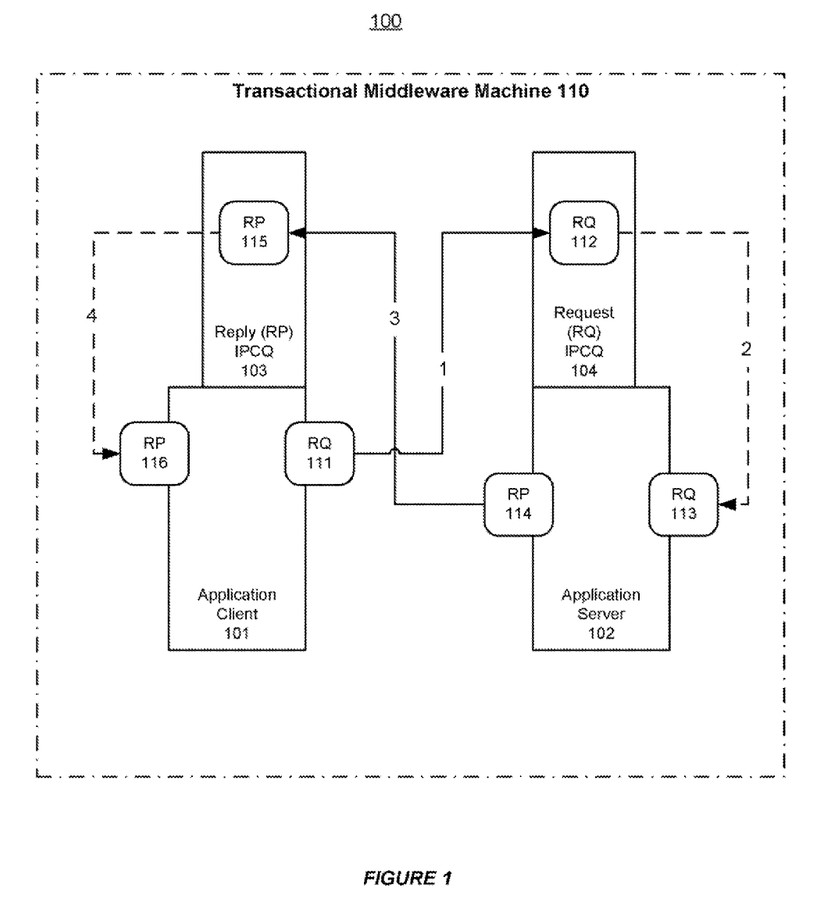
FIG. 1 shows an illustration of intra-node communication based on one or more inter-process communication message queues (IPCQs) in a transactional middleware machine environment.

FIG. 1 shows an illustration of intra-node communication based on one or more inter-process communication message queues (IPCQs) in a transactional middleware machine environment. As shown in FIG. 1, a transactional middleware machine 110 in a transactional middleware machine environment 100, e.g. the Tuxedo environment, can include an application client 101 and an application server 102, each of which can use an inter-process communication message queue (IPCQ) for supporting inter-process communication.

For example, the application client 101 can be associated with a reply (RP) IPCQ 103, while the application server 102 can be associated with a request (RQ) IPCQ 104. In Tuxedo, the inter-process communication message queue (IPCQ) can be either a System V IPC message queue or a remote direct memory access (RDMA) message queue (MSGQ).

Furthermore, in order to transmit a single message, the inter-process communication message queue (IPCQ) may need to use at least two copies of the single message, such as:

a first copy of the message from a sender, e.g. the application client 101, to an IPCQ 103 associated with the sender, and a second copy from the IPCQ 103 to the receiver, e.g. the application server 102.

Similarly, a message round trip between the application client 101 and the application server 102 may involve at least four copies of the message:

A first copy used by the application client 101 to send a request (RQ) message 111 to a request (RQ) IPC queue 104 associated with a application server 102 (as request (RQ)message 112), A second copy used by the application server 102 to receive the request (RQ) message 113 from its request (RQ) IPC queue 104, A third copy used by the application server 102 to send a reply (RP) message 114 to a reply (RP) IPC queue 103 associated with the application client 101 (as reply (RP) message 115), and A fourth copy used by the application client 101 to receive the reply (RP) message 116 from its reply (RP) IPC queue 103.

Thus, the performance of intra-node messaging of the system may be restricted, both in terms of resource usage and in terms of message processing time, due to the need for handling multiple copies of the same message, especially when the message involves large message buffers.

Shared Memory Queue (SHMQ)

In accordance with an embodiment of the invention, a shared memory queue (SHMQ) can be used for local messaging in a transactional middleware machine environment, e.g. enhancing native tpcall performance in Tuxedo.

Figure 2:
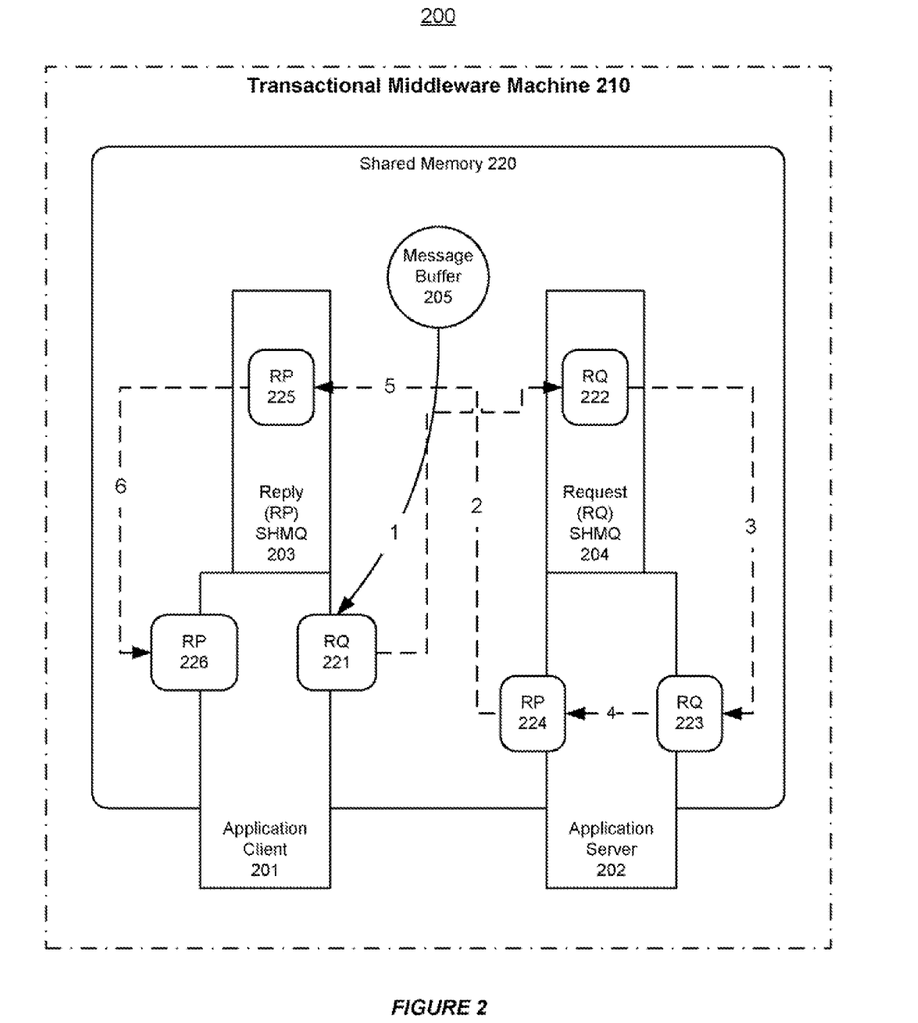
FIG. 2 shows an illustration of intra-node communication based on one or more shared memory queues (SHMQs) in a transactional middleware machine environment, in accordance with an embodiment of the invention.

FIG. 2 shows an illustration of intra-node communication based on one or more shared memory queues (SHMQs) in a transactional middleware machine environment, in accordance with an embodiment of the invention. As shown in FIG. 2, the intra-node messaging within a single transactional middleware machine 210 in a transactional middleware machine environment 200, e.g. the Tuxedo environment, can be based on a shared memory 220, e.g. the local bulletin board (BB) in Tuxedo.

The transactional middleware machine 210 can include communication peers, such as an application client 201 and an application server 202, each of which can use a shared memory queue (SHMQ). For example, the application client 201 can be associated with a reply (RP) SHMQ 203, and the application server 202 can be associated with a request (RQ) SHMQ 204. Both the reply (RP) SHMQ 203 and the request (RQ) SHMQ 204 can reside in the shared memory 220, which is attached with the communicating peers 201 and 202.

A message can be allocated in the shared memory 220 using a message buffer 205. Furthermore, the sending of the message can be implemented by linking the message buffer 205 to a shared memory queue (SHMQ), e.g. the request (RQ) SHMQ 204, and the receiving of the message can be implemented by delinking message buffer 205 from the shared memory queue (SHMQ), e.g. the request (RQ) SHMQ 204. Thus, the transmission of the message between the communicating peers 201-202 can require no physical copy.

After receiving the message in the message buffer 205, the server can modify it, and can send it to the client 201 in by linking the message buffer 205 to the reply (RP) SHMQ 203. Again, the receiving of the message can be implemented by delinking the message buffer 205 from the RP SHMQ 203. Thus, the transmission requires no physical copy of the message.

As shown in FIG. 2, the system can support a message round trip using a RP SHMQ 203 and a RQ SHMQ 204.

At step 1, the application client 201 can allocate a message buffer 205 in the shared memory 220 for a request (RQ) message 221.

At step 2, the application client 201 can link the message buffer 205 to a request SHMQ 204 attached to the application server 202 (as a request (RQ) message 222), and optionally notify the server 202 of the incoming new message.

At step 3, the application server 202 can delink the message buffer 205 from its request SHMQ 204 and receives the request (RQ) message 223 which points to the message buffer 205.

At step 4, the application server 202 can modify or reuse the message buffer 205 for sending a reply (RP) message 224.

At step 5, the application server 202 can link the message buffer 205 to a reply (RP) SHMQ 203 attached to the application client 201 (as a reply (RP) message 225), and optionally notify the client 201 of the incoming new message.

Finally, at step 6, the application client 201 can receive the reply (RP) message 226 by delinking the message buffer 205 from its reply SHMQ 203.

Thus, using the shared memory queue (SHMQ), a message round trip between the communicating peers, e.g. the application client 201 and the application server 202, can involve zero copies of the message.

In accordance with an embodiment of the invention, each SHMQ can be bounded with an inter-process communication message queue (IPCQ). The IPCQ can accept both the shared memory messages (SHMMSGs) and local memory messages, while SHMQ may only accept the shared memory messages (SHMMSGs).

Using the shared memory queue (SHMQ) feature, all message buffers can be centralized in the shared memory 220 instead of in the local memory of each process. In order to ensure the stability and high performance of the system, the shared memory queue (SHMQ) can recycle message buffers from the dead (or terminated) applications, and to fail over to local memory buffers when SHMMSG buffers are exhausted.

Furthermore, the IPCQ can work as a notification channel for the SHMQ. For example, a sender can use the IPCQ to send a short message between the communication peers for coordinating the transmission of the shared memory messages (SHMMSGs). Additionally, the IPCQ can also act as a backup queue when SHMQ fails. Also, by bounding an IPCQ to a SHMQ, other features such as message queue (MSGQ), multi-thread server and restartable server, which may be available for the IPCQ, can be easily applied to the SHMQ.

In the example of Tuxedo, each Tuxedo server can have a request (RQ) SHMQ, and each Tuxedo client can have at least a reply (RP) SHMQ. These shared memory queues (SHMQs) can be assigned to the Tuxedo application after the bulletin board (BB) is attached.

Figure 3:
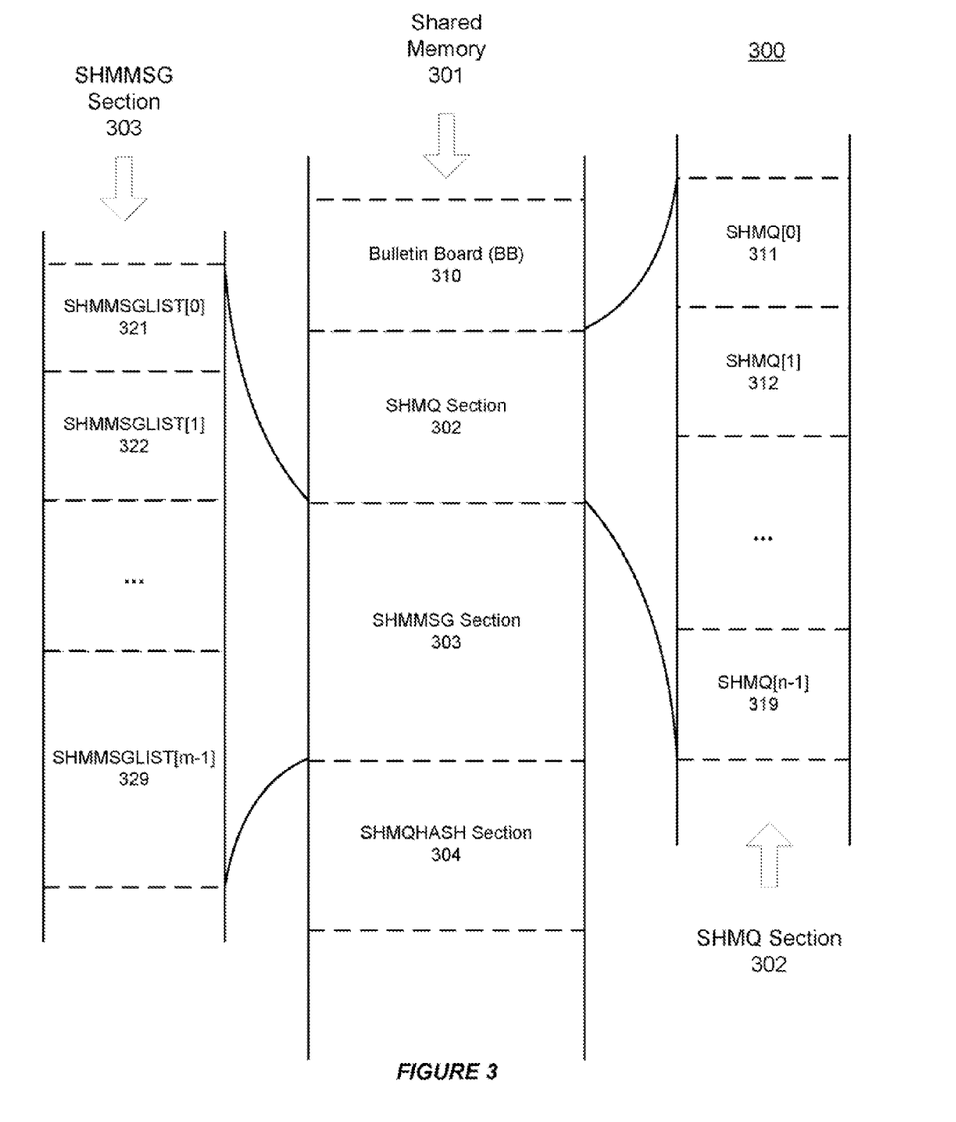
FIG. 3 shows an illustration of a shared memory layout for a shared memory queue (SHMQ) in a transactional middleware machine environment, in accordance with an embodiment of the invention.

FIG. 3 shows an illustration of a shared memory layout for a shared memory queue (SHMQ) in a transactional middleware machine environment, in accordance with an embodiment of the invention. As shown in FIG. 3, the shared memory 301 in a transactional middleware machine environment 300 includes one or more sections that can be stored continuously, e.g. a SHMQ section 302, a SHMMSG section 303 and a SHMQHASH section 304. In the example of Tuxedo, these sections 302-304 can be attached to an existing local bulletin board (BB) 310.

The SHMQ section 302 can store an array of shared memory queue (SHMQ) head structures, e.g. SHMQ[0] 311 to SHMQ[n−1] 319. The total element number, n, representing the number of queues for which memory space need to be allocated, is the sum of (MAXQUEUES+MAXACCESSERS+MAXADMIN). MAXQUEUES is the maximum number of queues that server processes require. MAXACCESSERS is the maximum number of queues that client processes require. MAXADMIN is the maximum number of queues that system processes require. The element number n also represents the total number of queues, including request and reply queues.

The SHMMSG section 303 includes one or more message lists, e.g. SHMMSGLIST[0] 321 to SHMMSGLIST[m−1] 329, each of which can store one or more messages of a particular size. Here, the number of message lists, m, can be configured in a configuration file, e.g. UBBCONFIG in Tuxedo. Furthermore, the message lists 321-329 can be stored in the SHMMSG section 303 of the shared memory 301 in an ascending order based on the message size.

Additionally, the SHMQHASH section 304 contains an array of indices that can be used for quickly finding a shared memory queue (SHMQ) in the shared memory 301. Each index can be used as a key in a hash table for finding the address of a queue head structure for a shared memory queue (SHMQ) in the shared memory 301.

Figure 4:
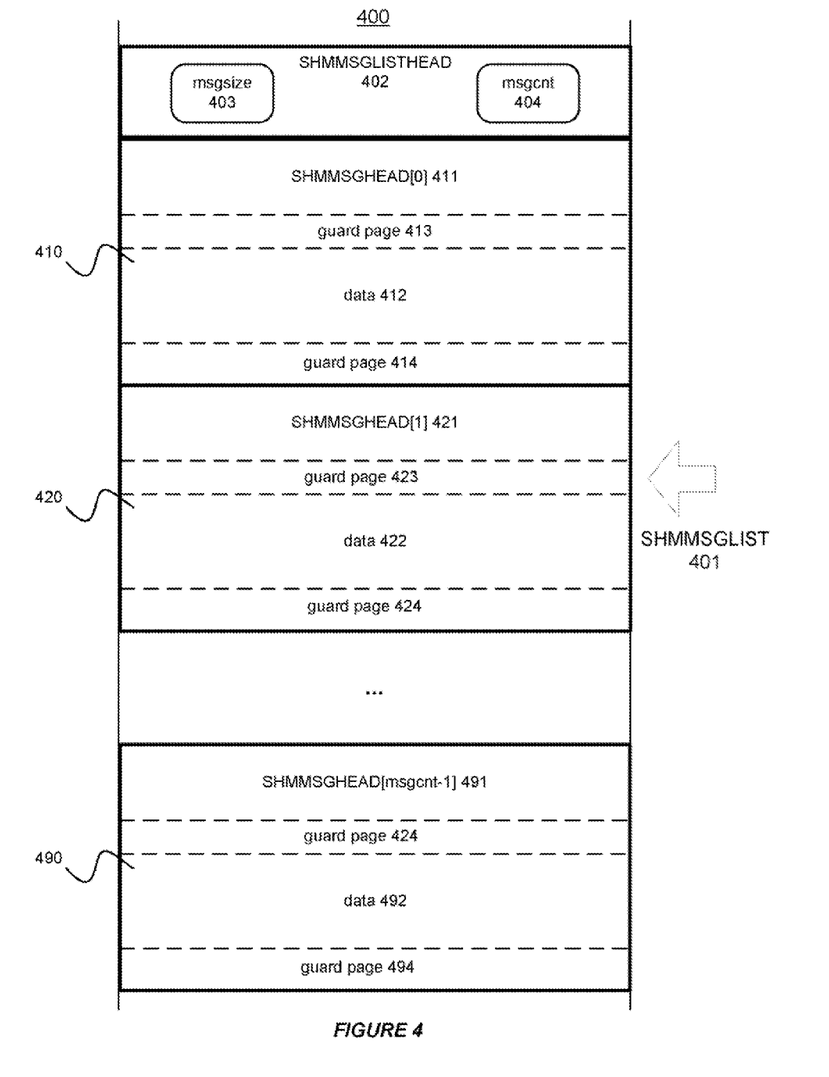
FIG. 4 shows an illustration of one or more shared memory messages in a shared memory for a shared memory queue (SHMQ) in a transactional middleware machine environment, in accordance with an embodiment of the invention.

FIG. 4 shows an illustration of one or more shared memory messages in a shared memory for shared memory queue (SHMQ) in a transactional middleware machine environment, in accordance with an embodiment of the invention. As shown in FIG. 4, a message list, e.g. SHMMSGLIST 401, can include a unified message list header, e.g. SHMMSGLISTHEAD 402, and an array of messages with the same body size, e.g. SHMMSG[0] 410 to SHMMSG[msgcnt−1] 490.

The SHMMSGLISTHEAD 402 can contain several attributes, e.g. msgsize 403 and msgcnt 404. These attributes can be configured in a configuration file, e.g. UBBCONFIG, with msgcnt 404 defining the number of individual messages, and msgsize 403 defining the size of messages stored in the message list 401.

Additionally, each message within the message list, e.g. SHMMSGLIST 401, can include a unified message header and a message body with a fixed size. Furthermore, there can be guard pages wrapping each message body in order to prevent accidental write accesses from corrupting the entire shared memory. For example, SHMMSG 410 includes SHMMSGHEAD[0] 411 and data 412 protected by guard pages 413-414; SHMMSG 420 includes SHMMSGHEAD[1] 421 and data 422 protected by guard pages 423-424; and SHMMSG 490 includes SHMMSGHEAD[msgcnt−1] 491 and data 492 protected by guard pages 493-494.

Figure 5:
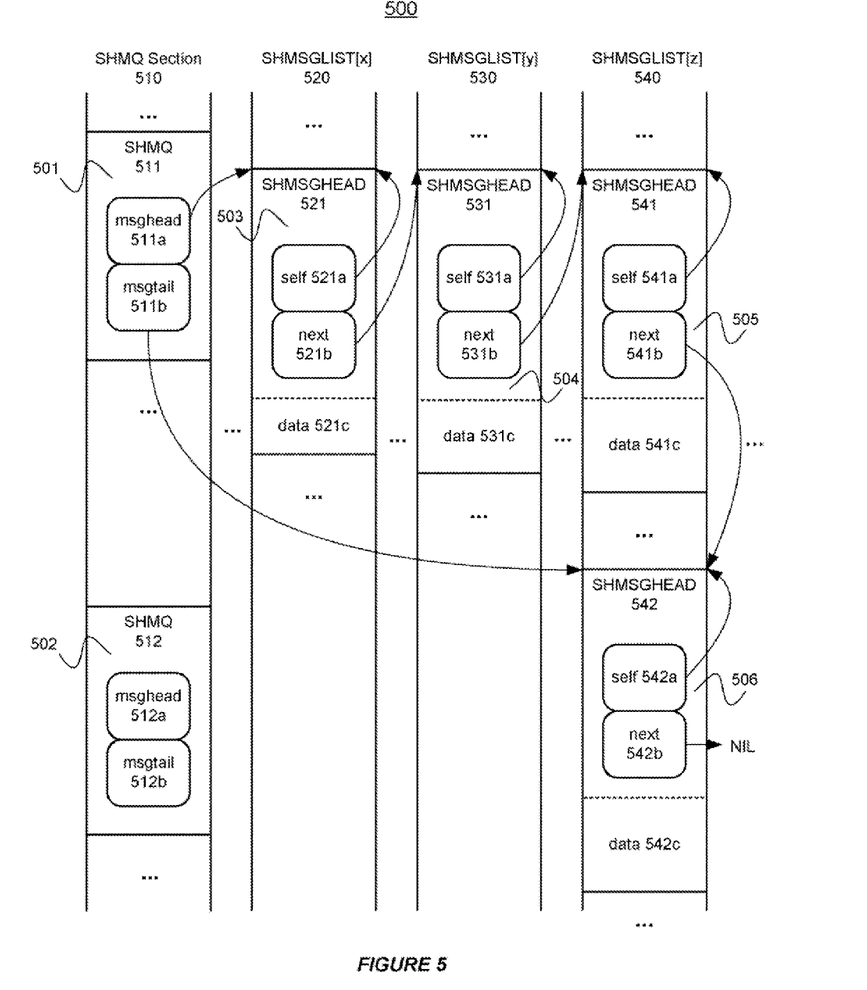
FIG. 5 shows an illustration of the addressing scheme in a shared memory for a shared memory messages (SHMMSG) in a transactional middleware machine environment, in accordance with an embodiment of the invention.

FIG. 5 shows an illustration of the addressing scheme in a shared memory for shared memory messages (SHMMSG) in a transactional middleware machine environment, in accordance with an embodiment of the invention. As shown in FIG. 5, one or more shared memory queues (SHMQs) 501-502, can be provided in a share memory 500. The shared memory 500 can be organized in a shared memory queue head section, e.g. a SHMQ section 510, and one or more message list sections, e.g. SHMSGLIST sections 520-540, with each message list containing an array of messages.

Each shared memory queue (SHMQ) 501-502 can include a queue head structure in the SHMQ section 510 and a linked-list of shared memory messages spanning over the one or more SHMSGLIST sections 520-540.

For example, the shared memory queue (SHMQ) 501 can include a queue head structure, SHMQ 511, and a linked-list of shared memory messages, e.g. SHMMSGs 503-506. The SHMQ 511 can be a control block that holds at least two links: a head link, msghead 511, and a tail link, msgtail 511b. The head link, msghead 511a, can point to a message head for the first message, e.g. SHMSGHEAD 521 for the message 503, and the tail link, msgtail 511b, can point to a message head for the last message, e.g. SHMSGHEAD 542 for the message 506.

Additionally, the shared memory queue (SHMQ), e.g. 501 or 502, can include a linked-list of shared memory messages (SHMMSG). Each message head holds at least two links: a self link that recursively points to itself, and a next link that points to the next message in the shared memory queue (SHMQ) 501.

For example, the SHMSGHEAD 521 for the message 503 can include a self link, self 521a, that points to its own SHMSGHEAD 521, and a next link, next 521b, that points to the SHMSGHEAD 531 for the message 504; the SHMSGHEAD 531 for the message 504 can include a self link, self 531a, and a next link, next 531b, that points to the SHMSGHEAD 541 for the message 505; the SHMSGHEAD 541 for the message 505 can include a self link, self 541a, and a next link, next 541b, that points to the SHMSGHEAD 542 for the message 506; and the SHMSGHEAD 542 for the last message 506 can include a self link, self 542a, and a next link, next 542b, that points to a empty slot, or is assigned with a value NIL.

Furthermore, the first message 503 in the shared memory queue (SHMQ) 501 can be a dummy (or blank) message, and the tail link can point to the dummy message when the shared memory queue (SHMQ) 501 is empty. This dummy (or blank) head can make queuing logic simple, since adding a new message to the shared memory queue (SHMQ) 501 can be implemented by linking the new message to the next link in the message head of the last message, to which the tail link points, regardless of whether the shared memory queue (SHMQ) 501 is empty or not.

Each shared memory message (SHMMSG) 503-506 can be a pre-allocated buffer in the shared memory 500. Each process attached to the shared memory can have an individual shared memory address in its own address space. Thus, the pointers to the shared memory message (SHMMSG) 503-506 may not be used directly in an inter-process situation.

In order to access a shared memory message (SHMMSG), a process can hold an array of pointers to the various shared memory message lists. Each shared memory message (SHMMSG) can be addressed using a shared memory message (SHMMSG) list address and an index within the shared memory message (SHMMSG) list. Thus, an address for a shared memory message (SHMMSG) can include two leveled indices: one link to a shared memory message list and another link to the shared memory message (SHMMSG) within the list.

In the example of Tuxedo, during system initialization, a number of message lists can be created in a local shared memory (e.g. the local BB), with each message list specified with a particular buffer size and message count. Additionally, a number of SHMQ heads can be created in the local BB according to user configuration. Tuxedo applications can allocate message buffers by calling tpalloc( )/tprealloc( ) after being attached to the local BB. Additionally, the tpalloc( )/tprealloc( ) calls can return buffer allocated in the local memory, before BB is attached or when shared memory buffer resource is exhausted.

Figure 6:
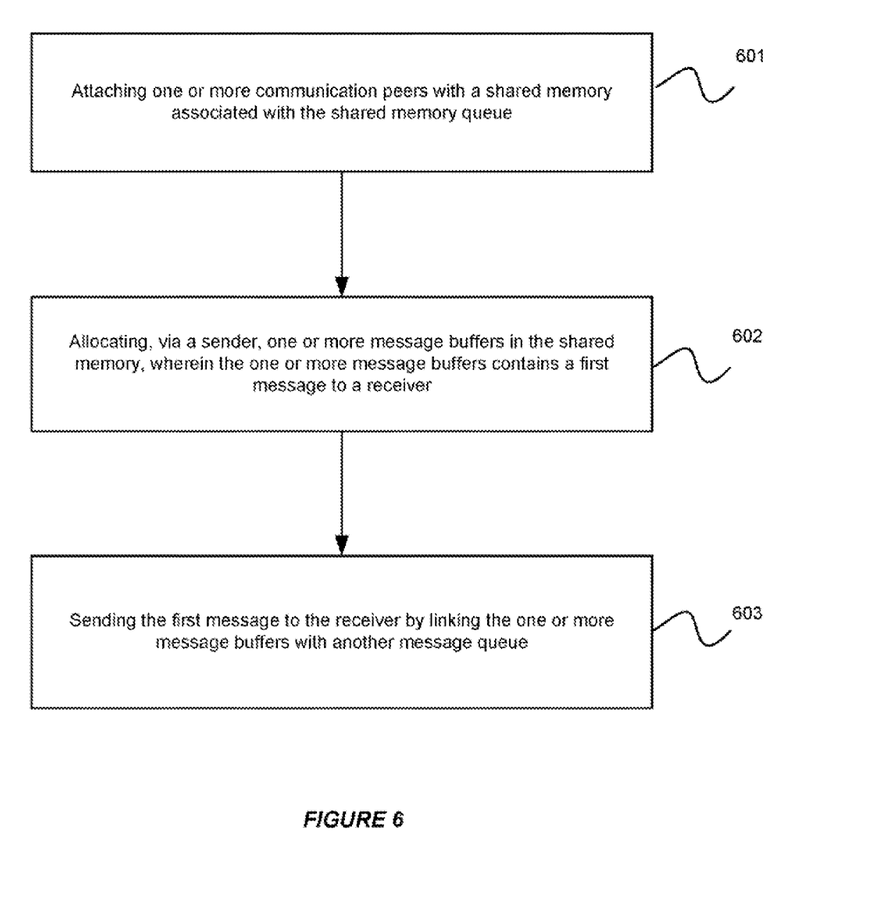
FIG. 6 illustrates an exemplary flow chart for supporting intra-node communication based on a shared memory queue (SHMQ) in a transactional middleware machine environment, in accordance with an embodiment of the invention.

FIG. 6 illustrates an exemplary flow chart for supporting intra-node communication based on shared memory queue (SHMQ) in a transactional middleware machine environment, in accordance with an embodiment of the invention. As shown in FIG. 6, at step 601, the system can attach one or more communication peers with a shared memory associated with the shared memory queue. Then, at step 602, a sender can allocate one or more message buffers in the shared memory, wherein the one or more message buffers contains a first message for a receiver. Furthermore, at step 603, the sender can send the first message to the receiver by linking the one or more message buffers with another message queue.

One-Copy Messaging

In accordance with various embodiments of the invention, the system allows a sender to make an additional copy of the original message in order to guarantee safe memory access with transparency. Thus, there can be no need for implementing additional application logic, which guarantees that the sender and the receiver of a message can access the shared message buffer mutual-exclusively.

Figure 7:
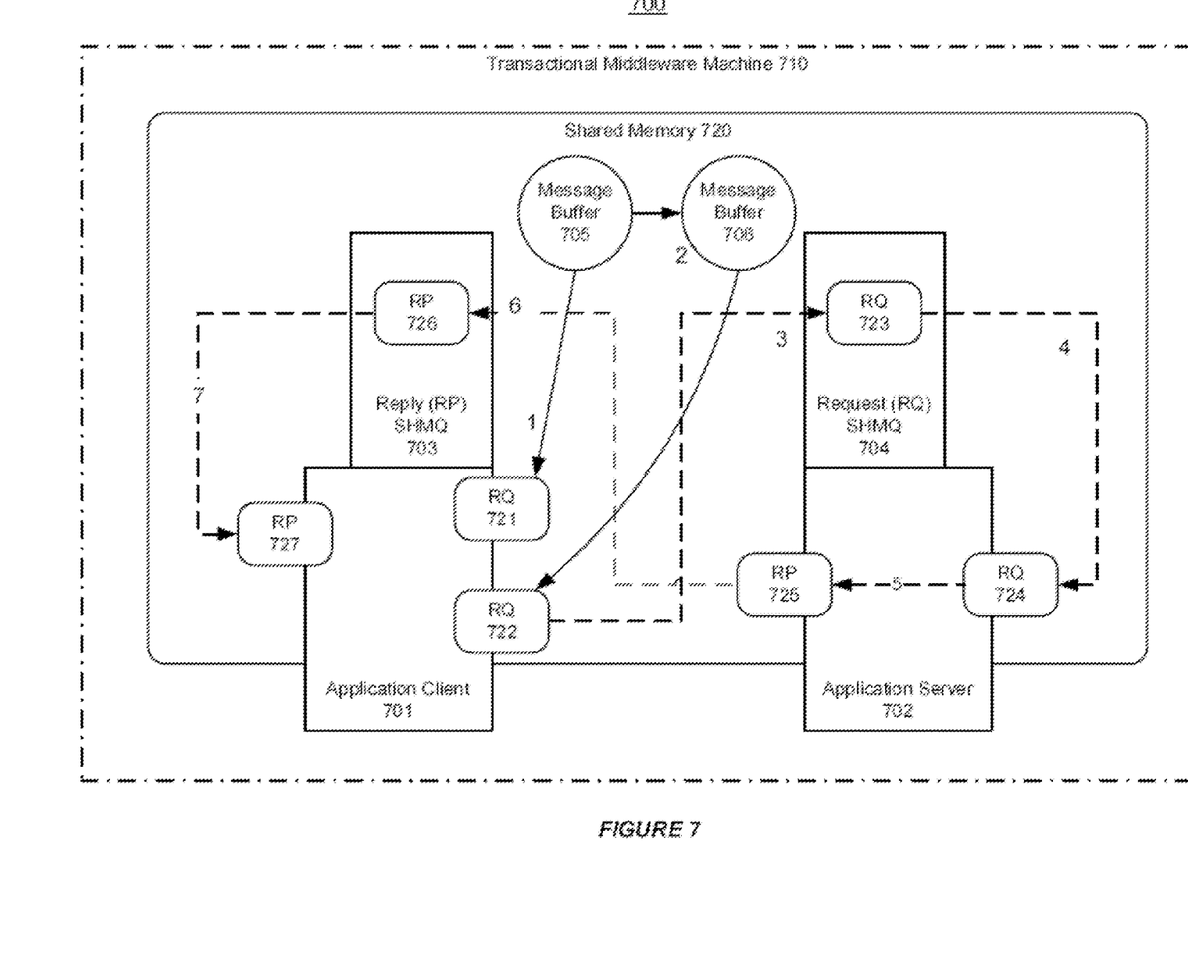
FIG. 7 shows an illustration of intra-node communication using one-copy messaging, in accordance with an embodiment of the invention.

FIG. 7 shows an illustration of intra-node communication using one-copy messaging, in accordance with an embodiment of the invention. As shown in FIG. 7, the intra-node messaging within a single transactional middleware machine 710 in a transactional middleware machine environment 700, e.g. the Tuxedo environment, can be based on a shared memory 720, e.g. the local bulletin board (BB) in Tuxedo.

As shown in FIG. 7, the system can support a message round trip using a RP SHMQ 703 and a RQ SHMQ 704.

At step 1, the application client 701 can allocate a first message buffer 705 in the shared memory 720 for a request (RQ) message 721.

At step 2, the application client 701 can allocate a second message buffer 706 in the shared memory 720, and copy the contents in the first message buffer 705 into the second message buffer 706 for the request (RQ) message 722.

At step 3, the application client 701 link the request message buffer 706 to a request (RQ) SHMQ 704 attached to the application server 702, and optionally notify the server 702 of the incoming request (RQ) message 723.

At step 4, the application server 702 can delink the message buffer 706 from its request (RQ) SHMQ 704 (the request (RQ) message 724).

At step 5, the application server 702 can modify or reuse the message buffer 706 for sending a reply (RP) message 725.

At step 6, the application server 702 can link the message buffer 706 to a reply SHMQ 703 attached to the application client 701, and optionally notify the client 701 of the incoming reply (RP) message 726.

Finally, at step 7, the application client 701 can receive the reply (RP) message 727 by delinking the message buffer 706 from its reply SHMQ 703.

Thus, using the shared memory queue (SHMQ), a message round trip between the communicating peers, e.g. the application client 701 and the application server 702, can involve one copy of the message.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting intra-node communication based on a shared memory, the method comprising:
providing, at a computer comprising a microprocessor, a shared memory for use by a plurality of communication peers comprising an application client and an application server for communicating messages between the plurality of communication peers;
allocating a message buffer in the shared memory, wherein the message buffer receives a shared memory message to be communicated between the application server and the application client without copying the message outside of the message buffer;
attaching the application client with a reply (RP) shared memory queue (SHMQ) within the shared memory;
attaching the application server with a request (RQ) SHMQ within the shared memory;
communicating the shared memory message to the application server without copying the shared memory message outside of the message buffer by:
linking, by the application client, the message buffer with the RQ SHMQ attached with the application server; and receiving the shared memory message by the application server by delinking, by the application server, the message buffer from the RQ SHMQ;

modifying, by the application server, the shared memory message in the message buffer in the shared memory to generate a modified shared memory message in the message buffer in the shared memory; and communicating the modified shared memory message to the application client without copying the modified shared memory message outside of the message buffer by:

linking, by the application server, the message buffer with the RP SHMQ attached with the application client; and receiving the modified shared memory message by the application client by delinking, by the application client, the message buffer from the RP SHMQ.

2. The method according to claim 1, further comprising:
replying to the message by communicating a reply message to the application client without copying the reply message outside of the message buffer by:
linking, by the application server, the message buffer with the RP SHMQ attached with the application client; and
receiving the reply memory message by the application client by delinking, by the application client, the message buffer from the RP SHMQ.

3. The method according to claim 1, further comprising:
configuring the RP and RQ SHMQs to include a head structure and a linked list of messages.

4. The method according to claim 1, further comprising:
pre-allocating the message buffer with a predetermined size, wherein the shared memory message is adapted to be shared among the plurality of communication peers.

5. The method according to claim 1, further comprising:
organizing the shared memory using a queue head section and one or more message list sections, wherein each of the message list sections includes an array of shared memory messages with a same body size.

6. The method according to claim 5, further comprising:
associating a hash table with the queue head section, wherein the hash table provides lookup for a requested RP SHMQ or RQ SHMQ in the shared memory.

7. The method according to claim 5, further comprising:
including in each RP SHMQ or RQ SHMQ a queue head structure and a linked-list of shared memory messages that are stored in the one or more message list sections.

8. The method according to claim 7, further comprising:
using a head link in the queue head structure to point to a dummy shared memory message; and
using a tail link in the queue head structure to point to a last shared memory message.

9. The method according to claim 7, further comprising:
using one or more two-level indices to address the shared memory messages in the linked-list, wherein each of the two-level indices includes an index to a shared memory message list and an index to a message within the message list.

10. The method according to claim 1, further comprising:
notifying, by the application client, the application server of the shared memory message in the shared memory before communicating the shared memory message to the application server.

11. A system for supporting intra-node communication based on a shared memory, comprising:
one or more microprocessors;
a shared memory for use by a plurality of communication peers comprising an application client and an application server for communicating messages between the plurality of communication peers;

a message buffer allocated in the shared memory, wherein the message buffer receives a shared memory message to be communicated between the application server and the application client without copying the message outside of the message buffer;

a reply (RP) shared memory queue (SHMQ) within the shared memory and attached with the application client; and a request (RQ) SHMQ within the shared memory and attached with the application server;

wherein the shared memory message is communicated to the application server without copying the shared memory message outside of the message buffer by:

linking, by the application client, the message buffer with the RQ SHMQ attached with the application server; and receiving the shared memory message by the application server by delinking, by the application server, the message buffer from the RQ SHMQ;

wherein the application server modifies the shared memory message in the message buffer in the shared memory to generate a modified shared memory message in the message buffer in the shared memory;

wherein the modified shared memory message is communicated to the application client without copying the modified shared memory message outside of the message buffer by:

linking, by the application server, the message buffer with the RP SHMQ attached with the application client; and receiving the modified shared memory message by the application client by delinking, by the application client, the message buffer from the RP SHMQ.

12. The system according to claim 11, wherein:
the RQ SHMQ operates to reply to the shared memory message by communicating a reply message to the application client without copying the reply message outside of the message buffer by:
linking, by the application server, the message buffer with the RP SHMQ attached with the application client; and
receiving the reply memory message by the application client by delinking, by the application client, the message buffer from the RP SHMQ.

13. The system according to claim 11, wherein:
the RP and RQ SHMQs comprise a head structure and a linked list of shared memory messages.

14. The system according to claim 11, wherein:
the message buffer is pre-allocated with a predetermined size, wherein the shared memory message is adapted to be shared among the plurality of communication peers.

15. The system according to claim 11, wherein:
the shared memory is organized using a queue head section and one or more message list sections, wherein each of the message list sections includes an array of shared memory messages with a same body size.

16. The system according to claim 15, further comprising:
a hash table associated with the queue head section, wherein the hash table provides lookup for a requested SHMQ in the shared memory.

17. The system according to claim 15, wherein:
the RP and RQ SHMQs comprise a queue head structure and a linked-list of shared memory messages that are stored in the one or more message list sections.

18. The system according to claim 17, wherein:
the RP SHMQ uses a head link in the queue head structure to point to a dummy shared memory message and uses a tail link in the queue head structure to point to a last shared memory message.

19. The system according to claim 17, further comprising:
one or more two-level indices which address the linked-list of shared memory messages, wherein each of the two-level indices includes an index to a message list and an index to a shared memory message within the message list.

20. A non-transitory machine readable storage medium having instructions stored thereon that, when executed, cause a system to perform steps comprising:
  providing a shared memory for use by a plurality of communication peers comprising an application client and an application server for communicating messages between the plurality of communication peers;
  allocating a message buffer in the shared memory, wherein the message buffer receives a shared memory message to be communicated between the application server and the application client without copying the message outside of the message buffer;
  attaching the application client with a reply (RP) shared memory queue (SHMQ) within a shared memory;
  attaching the application server with a request (RQ) SHMQ within the shared memory;
  communicating the shared memory message to the application server without copying the shared memory message outside of the message buffer by:
    linking, by the application client, the message buffer with the RQ SHMQ attached with the application server; and
    receiving the shared memory message by the application server by delinking, by the application server, the first message buffer from the RQ SHMQ;
  modifying, by the application server, the shared memory message in the message buffer in the shared memory to generate a modified shared memory message in the message buffer in the shared memory; and
  communicating the modified shared memory message to the application client without copying the modified shared memory message outside of the message buffer by:
    linking, by the application server, the message buffer with the RP SHMQ attached with the application client; and
    receiving the modified shared memory message by the application client by delinking, by the application client, the message buffer from the RP SHMQ.

* * * * *

UNITED STATES PATENT AND TRADEMARK OFFICE
CERTIFICATE OF CORRECTION

PATENT NO. : 9,665,392 B2
APPLICATION NO. : 13/804687
DATED : May 30, 2017
INVENTOR(S) : Lv et al.

Page 1 of 1

It is certified that error appears in the above-identified patent and that said Letters Patent is hereby corrected as shown below:

In the Specification

In Column 8, Line 30, after "data" insert -- . --.

In the Claims

In Column 12, Line 11, in Claim 20, after "the" delete "first".

Signed and Sealed this
Thirtieth Day of January, 2018

Joseph Matal
*Performing the Functions and Duties of the
Under Secretary of Commerce for Intellectual Property and
Director of the United States Patent and Trademark Office*